United States Patent [19]

Levine et al.

[11] 4,303,581

[45] Dec. 1, 1981

[54] WATER DISPERSED PRIMER-SURFACER COMPOSITION

[75] Inventors: Morris Levine, Cleveland Heights; Michael Yurcheshen, Parma Heights; Roland W. Hight, Brookpark, all of Ohio

[73] Assignee: PPG Industries, Inc., Pittsburgh, Pa.

[21] Appl. No.: 169,237

[22] Filed: Jul. 16, 1980

[51] Int. Cl.³ .................... C08L 91/00; C08L 61/28
[52] U.S. Cl. .................... 260/18 PF; 260/21; 260/29.2 EP; 260/29.4 UA; 260/29.6 NR; 260/37 EP; 428/416; 428/418
[58] Field of Search ............ 260/29.4 UA, 29.2 EP, 260/29.6 NR, 29.6 TA, 18 PF, 21, 37 EP

[56] References Cited

U.S. PATENT DOCUMENTS

| | | | |
|---|---|---|---|
| 3,492,252 | 1/1970 | Euchner et al. | 260/8 |
| 3,650,998 | 3/1972 | Sekmakas et al. | 260/21 |
| 3,652,478 | 3/1972 | Ishii et al. | 260/29.4 |
| 3,679,618 | 7/1972 | Lohr | 260/21 |
| 3,798,193 | 3/1974 | Perekh et al. | 260/29.4 |
| 3,862,071 | 1/1973 | Di Carlo | 260/29.4 |
| 3,865,771 | 2/1975 | Sekmakas | 260/29.3 |
| 3,896,072 | 7/1975 | Tummler et al. | 260/29.6 TA |
| 3,908,049 | 9/1975 | Fitko | 427/386 |
| 3,962,167 | 6/1976 | Martorano | 260/29.4 UA |
| 3,970,628 | 7/1976 | Connelly et al. | 260/29.6 NR |
| 4,098,740 | 7/1978 | Wallace | 260/29.6 NR |
| 4,137,207 | 1/1979 | Fuchs et al. | 260/29.6 |

*Primary Examiner*—Theodore E. Pertilla
*Attorney, Agent, or Firm*—Charles R. Wilson

[57] ABSTRACT

Water based primer-surfacer compositions for application in the automotive industry over bare or treated metal and under a top coat of acrylic lacquer or enamel are formulated in aqueous medium using a latex of an addition copolymer prepared by emulsion polymerization of a mixture of styrenic and acrylic monomers, with hydroxyl and carboxyl functionality, preferably a mixture of styrene, ethyl acrylate, 2-hydroxy-ethyl methacrylate and acrylic acid. The latex is the predominant film forming ingredient in the composition and is combined with minor amounts of other film forming ingredients including a water soluble epoxy ester, preferably derived from bisphenol A, diglycidyl ether, drying oil fatty acids and maleic anhydride and water soluble or dispersible aminoplast resins, preferably methoxylated melamine formaldehyde resin and butoxylated urea formaldehyde resin. Pigments are also normally present in the composition.

14 Claims, No Drawings

WATER DISPERSED PRIMER-SURFACER COMPOSITION

BACKGROUND OF THE INVENTION

This invention relates to improved water based coating compositions for use as a primer-surfacer over metal prior to application of a top coat of an acrylic type enamel or lacquer. It is directed specifically to water based compositions for this purpose in which the resinous film-forming vehicle and binder for any pigments present is composed of a combination of three distinct types of resins two of which, present in minor proportions, are, respectively, an epoxy ester resin and an aminoplast resin and the third of which, present in predominant proportions, is a particular addition copolymer of a styrenic type monomer and a combination of acrylic type monomers, prepared by aqueous emulsion polymerization and used, as prepared, in the form of an aqueous dispersion or latex.

In the automotive industry it is conventional to spray paint the metal parts of the assembly with a two-coat system consisting of a primer followed by a finish lacquer or enamel of the acrylic type. Primers are used to protect the metal from rust and corrosion, to serve as an adhesion-promoting tie coat between the substrate and the finish lacquer or enamel and as a sandable sealer or surfacer to enhance the final appearance of the painted surface. Compositions for priming automotive assemblies were previously formulated using organic solvents as the volatile carrier vehicle to be removed in the drying or baking cycle, and the equipment has been designed for their use. It is now necessary, because of environmental concerns and other reasons, that the formulation be water-based.

Many water based formulations for metal coating are known to the prior art. Some contain water soluble or dispersible epoxy esters as the film-forming vehicle and others contain relatively low molecular weight addition copolymers of styrenic type monomer with acrylic type monomers prepared by solution polymerization of the monomers in a water miscible organic solvent and modified so as to be reactive or cross-linkable. Aminoplast resins are generally present to assist in the cure. Formulations disclosed are often complex in nature in order to make them adaptable for electrocoating application, as is the case with the formulations disclosed in U.S. Pat. Nos. 3,650,998; 3,652,478 and 3,865,771. While such formulations make use of reactive resinous addition copolymers or styrenic and acrylic monomers, and reactants used for epoxy ester resins, they do not embody the three separately prepared types of resins as above set forth, one of which, the styrenic acrylic copolymer, is present in latex form.

Further, the application of a primer by electrocoating, while quite effective in protecting metal parts against corrosion, is not sufficient to enable elimination of a primer-surfacer under acrylic lacquers or enamels because of the need for better adhesion, and also to provide the "fill" for sanding and smoothing of the primer-surfacer so as to obtain the desired appearance after application of the top coat. There is consequently a need for a water-based primer-surfacer composition which can be applied by spraying to automotive assemblies, from which the volatile ingredients are removed in existing equipment, and which meets all the requirements for application under acrylic lacquer or acrylic enamel top coats. No composition has heretofore been found which consistently and adequately serves these purposes.

SUMMARY OF THE INVENTION

This invention provides a water-based coating composition, highly suitable for use as a primer-surfacer for spray application to automotive assemblies on existing lines prior to application of a finish coat of acrylic type lacquer or enamel. The composition is formulated to contain a combination of three essential resinous film forming or binder ingredients each of a distinct and different type and each present in a critical proportion with respect to the total. The first essential ingredient, which must be present in a proportion ranging from 50 to 90, preferably 60 to 80 percent by weight of the total of the binder ingredients, is a high molecular addition copolymer of a styrenic monomer with acrylic monomers in latex form as prepared by aqueous emulsion polymerization of a monomer mixture containing at least about 40 percent by weight of the styrenic monomer, from 2 to 8 percent by weight of a monomer containing hydroxyl functionality and from 1 to 6 percent by weight of a monomer containing carboxyl functionality. The second essential ingredient, present in a proportion of about 5 to 40 percent by weight of the total binder ingredients, is a water soluble epoxy ester resin and the third essential ingredient, present in a proportion of about 5 to 20 percent by weight of the total binder ingredients, consists of a water soluble or water dispersible aminoplast resin or more preferably, a combination of two such resins.

The compositions so formulated are water based or water reducible so as to meet environmental requirements. They normally contain certain dispersed pigments in substantial proportions and sometimes contain small proportions of other non-essential ingredients. The primer coats spray deposited therefrom adhere excellently to the substrate and to the acrylic top coat under conditions of high humidity, as is required by the automotive industry; they are not prone to solvent "popping" or blistering after application or in the final coating with the acrylic top coat applied. They may be sanded without difficulty to provide a smooth surface for the top coat of acrylic lacquer or enamel and there is excellent resistance to chipping and retention of gloss in the final surface.

DETAILED DESCRIPTION OF INVENTION INCLUDING SPECIFIC EMBODIMENTS

The preparation of the first of the three essential resinous film forming or binder ingredients used in the compositions of this invention, ie, the resinous addition copolymer of a styrenic monomer with acrylic monomers, containing hydroxyl and carboxyl functionality present in latex form, is illustrated by the following Example 1 in which, and elsewhere herein, all parts and percentages unless otherwise indicated are by weight.

EXAMPLE 1

Preparation of Illustrative Styrenic/Acrylic Copolymer Latex

A polymerization vessel equipped with means for heating and agitating its contents and delivery of materials thereto is charged with 2,000 parts deionized water containing 3.8 parts of the well known emulsifier commercially available as "Siponate DS-10" and 1.9 parts of sodium bicarbonate buffer, and the contents brought to a temperature of 75° C. whereupon 3.8 parts of ammonium persulfate, a well known free radical polymerization initiator, are added and temperature brought to 80° C. A monomer mixture made up of 608 parts styrene, 851 parts ethyl acrylate, 31 parts 2-hydroxyethyl methacrylate and 30 parts acrylic acid is then added with agitation over a period of 3 hours. After 1.5 hours have elapsed a water solution of 3.8 parts of "Siponate DS-10" and 1.9 parts ammonium persulfate is gradually added over the remaining 1.5 hours. Agitation is continued for an additional hour by which time polymerization of the monomer mixture is essentially complete and a latex containing finely divided particles of solid styrene/ethylacrylate/2-hydroxyethyl methacrylate/acrylic acid addition copolymer dispersed in the aqueous medium is formed. 29 parts of deionized water and 29 parts dimethyl ethanol amine are added; the latex allowed to cool to room temperature and then filtered through a cheesecloth. The latex so prepared is of a white milky color, has a solids content of 38.8 percent, a viscosity of 33.5 centipoises, an acid value of 18.2 and a pH of 9.2. It is well suited without change for use in formulating the coating compositions of this invention as will be hereinafter described.

VARIATIONS IN STYRENIC/ACRYLIC COPOLYMER LATEX

Example 1 is illustrative only and many variations may be made in the procedures and materials used while still obtaining a latex of styrenic acrylic copolymer having hydroxyl and carboxyl functionality which is substantially equivalent to that of Example 1. Thus the details of the emulsion polymerization process including the nature and amounts of emulsifiers, free radical polymerization initiators and other non-monomeric additives; the order of addition of ingredients; polymerization temperature etc. are not at all critical so long as the polymerization of the monomers is carried out in aqueous emulsion in any of the manners well known in the emulsion polymerization art. Suitable emulsifiers include both ionic and non-ionic types; many are well known to the art and may be used. Free radical polymerization initiators in addition to ammonium persulfate include hydrogen peroxide, sodium persulfate, peroxycarbonates and the like.

The nature and amounts of the monomers polymerized may also be varied within limits. One of the monomers present in an amount of at least 40 percent, preferably from 40 to 60 percent, of the total monomers must be styrene or some other styrenic monomer, by which is meant a monomer containing a

addition polymerizable group attached to a benzene ring. Styrenic monomers other than styrene, include, for example, alpha-methyl styrene, vinyl toluene, p-methyl styrene, ethyl styrenes, methoxy styrenes, chlorostyrenes, vinyl xylenes and vinyl naphthalene.

It is also essential that one of the monomers, present in an amount from about 2 to about 8 percent of the monomer mixture, contain in addition to the

addition polymerizable group, an hydroxy group. Preferred hydroxy monomers in addition to the 2-hydroxyethyl methacrylate used in Example 1 are other hydroxy substituted acrylic monomers of the structure

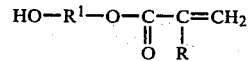

wherein R represents hydrogen or methyl and HO—R$^1$ represents a hydroxy substituted alkyl group containing 1 to 4 carbon atoms including specifically hydroxymethyl acrylate, hydroxy-methyl methacrylate, 2-hydroxy-ethyl acrylate, 3-hydroxy-propyl acrylate, 4-hydroxybutyl methacrylate etc. Still other hydroxy monomers which can be substituted for 2-hydroxyethyl methacrylate are alpha-methylol ethyl acrylate, N-methylol acrylamide and allyl alcohol.

Another of the monomers, present in an amount from about 1 to 6 percent of the monomer mixture, is included in order to impart carboxyl functionality to the copolymer in the latex. Acrylic acid is used for this purpose in Example 1 but other similar monomers, including methacrylic acid, chloroacrylic acid, etc. which contain the

addition polymerizable group and a carboxyl group, preferably directly attached, may be substituted if desired.

The remaining acrylic monomers exemplified by ethyl acrylate in Example 1, are preferably acrylic ester type monomers of the general formula

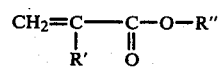

wherein R' is hydrogen or methyl and R" is alkyl group containing 1 to 8 carbon atoms. Typical examples of such acrylic ester monomers include, in addition to ethyl acrylate, methyl methacrylate, ethyl methacrylate and the propyl, hexyl, n-octyl, and 2-ethylhexyl acrylates and methacrylates. Other acrylic monomers without hydroxyl or carboxyl functionality are acrylonitrile and methacrylonitrile and these may be substituted in whole or in part for the acrylic ester although this is not generally preferred.

It is also to be mentioned that the solids content, viscosity, acid value, and pH of the latex illustrated in Example 1 are not limiting factors although it is preferred to use, in the formulation of this invention, latexes of the nature described which contain a solids content of 25 to 50 percent, a viscosity of 10 to 50 centipoises, an acid value below 25 and a pH above 7.

EPOXY ESTER RESIN COMPONENT OF COMPOSITIONS OF THIS INVENTION

Epoxy esters are a well known class of resins used in the coatings industry. They are prepared by reacting epoxy resins, either solids or liquids, with drying oil fatty acids. Any of the water compatible epoxy esters may be utilized as the second essential film forming or binder ingredient in the compositions of this invention. Epoxy resins are generally polyethers containing hydroxyl groups and epoxide groups and are prepared by the reaction of a diol, particularly a dihydric phenol, preferably a bis phenol such as Bisphenol A, with an epoxidizing agent such as epichlorohydrin, diglycidyl ether or the like. They are available to the coatings industry from Shell Chemical Company under the "Epon" trade name and from other sources. To form water compatible epoxy esters for use in this invention from such epoxy resins, the epoxy resin is esterified, as is well known in the art, by reacting some of the hydroxyl groups with monocarboxylic acids, especially drying oil fatty acids such as those derived from linseed oil, soya oil, tall oil, castor oil and the like, and the resulting epoxy ester then preferably further reacted at additional hydroxyl groups with a polycarboxylic acid or anhydride such as trimellitic acid or anhydride or, most preferably, maleic anhydride, to introduce free carboxyl groups which, of course, form water soluble salts in alkaline medium.

The preparation of a preferred water soluble epoxy ester resin for use in this invention is illustrated by Example 2.

EXAMPLE 2

Epoxy Ester Resin Preparation

To a reactor is charged 715 parts of a mixture of drying oil fatty acids commercially available under the trade name "Pamolyn 200" and 245 parts of an epoxy resin commercially available under the trade name "Epon 828", which is a hydroxy ethoxy polyether prepared from "Bis-Phenol A" and diglycidyl ether, having a viscosity of about 350 centipoises. The reactants are brought to a temperature of 120° F. with agitation under a blanket of inert nitrogen gas; 0.86 parts of benzyl dimethyl amine and 0.86 parts stannous octoate are added to aid in the esterification reaction and the esterification allowed to proceed for a total of 8-10 hours at a maximum temperature of 480° F. During the esterification the acid value of the mixture drops from a value of about 90 to a value of about 6. There is then added, after cooling, 191 parts of maleic anhydride and the mixture exothermed for an additional 2-4 hours at 370°-430° F. whereupon the acid value is increased to about 78. The epoxy ester so prepared is then mixed with 2,565 parts deionized water and 239 parts diethyl amine to form a solution having a pH of 9.8 and a viscosity of 150 centipoises. It consists of approximately 70 percent of solvent of which 91.5 percent is deionized water and 8.0 percent diethylamine and approximately 30 percent of epoxy ester resin solids of which about 65 percent is derived from "Epon 828", about 20 percent from "Pamolyn 200" and about 15 percent from maleic anhydride.

AMINOPLAST RESIN COMPONENT OF COMPOSITIONS OF THIS INVENTION

The third essential film forming component of the compositions of this invention is a water soluble or water dispersible aminoplast resin. Although any of the well known and commercially available materials of this class may be used it is preferred that the aminoplast resin be a water soluble condensation product of an aldehyde of 1 to 4 carbon atoms, especially formaldehyde, with either melamine or urea, in which a portion of the alkylol groups derived from the aldehyde are etherified with an alkanol of 1 to 4 carbon atoms, especially methanol or butanol to produce pendant alkoxy groups and reduce the free alkylol content to the order of 0.1 percent to about 15 percent. Such aminoplast resins are well known materials and are commercially available under the "Cymel" and "Beetle" trade names.

APPLICATION AND FORMULATION OF COMPOSITIONS OF THIS INVENTION

As indicated hereinabove, the water based primer-surfacer compositions of this invention are designed for use on existing lines in automotive assembly plants where the assembled vehicle is first coated by spraying the primer-sealer composition which is heated to dry or bake the primer coat and is thereafter again sprayed or otherwise coated with an acrylic lacquer or enamel to provide the finished surface. The metal parts of the assembly are normally not "bare metal" at this point but rather have been treated by conventional methods to protect them from rust and corrosion, one of which methods, now extensively used, is to electrodeposit on the metal in an electrocoating bath, either anionic or cationic in nature, a thin "electrocoat" which exactly follows the contours of the metal part and hence is insufficient for providing the "fill" and porosity needed for sanding, smoothing and preparing the surface before the final coat.

The primer coat after "baking", which must occur under conditions ranging from 30 minutes at 275° F. to 90 minutes at 350° F. (and which is normally 30 minutes at 325° F.) must adhere sufficiently to the substrate that it is not removed in a standard adhesion test (normally consisting of cross hatching a substrate panel on which the primer-surfacer is baked, applying tape to the cross hatchings, removing it quickly and observing if any of the primer-surfacer is removed, in which case the coating "fails" the test) either before or after the primer-surfacer coated surface is exposed to high humidity (100% in the normal test) at high temperature (100° to 150° C. in the normal test) for periods of up to several days (24 to 96 hours in the normal test). These same adhesion requirements must also apply after the primer-surfacer coat is top coated with either acrylic lacquer or acrylic enamel. Acrylic lacquers contain film-forming high molecular polymers, such as polymethyl methacrylate, which may be plasticized, and which do not undergo chemical change on drying, while acrylic enamels contain film forming ingredients which react with one another to form a higher-molecular cross linked network after application and on drying, baking and cure; a typical acrylic enamel contains reactive hydroxyl containing acrylic polymer together with resins, such as aminoplasts, which react therewith to form the enamel coating. The two types of acrylic top coatings are thus different in nature but the primer surfacer coat, to be satisfactory, must adhere to either.

The final acrylic lacquer or enamel top coat applied after the primer-surfacer coat must also be so integrated with the primer-surfacer coat that it is "chip resistant" as measured by a standard "gravelometer" test in which the coated metal is exposed to low temperature and then subjected to blown gravel at 90 lbs. sq. in., without "chipping" of the coated surface occurring. The coated surface must not blister, nor "pop" due to release of water from the water-based composition. It must maintain the desired gloss and appearance unaffected by the nature of the primer-surfacer present. It must also, of course, resist corrosion as measured by the well known "salt spray" test.

The compositions of this invention, containing the above indicated three essential film forming ingredients in the critical proportions, have been found to meet all the requirements and tests specified by the automotive industry for a water-based primer-surfacer. It is believed that this is due primarily to the fact that the compositions contain the specified latex component as the predominant film forming ingredient present in the range of 50 to 90 percent, preferably 60 to 80 percent, of the total film forming ingredients. The latex, however, can not be the sole film forming ingredient since it can not serve as a grinding media for pigments normally present. Also if used, without other film forming ingredients, there is inadequate adhesion to the substrate, especially if the latter be electrocoated with a water based composition containing epoxy ester, as is often the case. Thus it is necessary that there be present from 5 to 40 percent of the total film forming or binder ingredients of the epoxy ester resin component. If the primer-surfacer is applied under acrylic lacquers, 10 to 20 percent of the epoxy ester component is sufficient but in case where applied under acrylic enamels, a higher proportion of the epoxy ester component, up to 40 percent of the total film forming ingredients has been found to result in better adhesion to the top coat. An aminoplast resin is needed in the formulation in order that the requisite baking or curing cycle be maintained. Best formulations for the desired purpose contain from 3 to 10 percent of total film forming ingredients of a water soluble methoxylated melamine formaldehyde resin which appears to combine with the latex ingredient to confer on the primer-surfacer coating the requisite hardness and sandability, and also from 3 to 10 percent of total film forming ingredients of a water soluble butoxylated urea formaldehyde resin, which, with the latex ingredient, appears to aid adhesion to the substrate under high humidity conditions. However, so long as the requisite amount of latex and epoxy ester is present, use of a single water soluble aminoplast resin in a proportion of about 5 to 20 percent of total film forming ingredients, instead of the preferred combination of the two specified aminoplast resins, gives satisfactory results.

The three essential resinous film forming ingredients comprise a minimum of 90 percent and a maximum of 100 percent of the total film forming or binder ingredients present in the primer-surfacer compositions. If they comprise between 90 and 100 percent, the remainder of the film forming ingredients is made up of small amounts of materials which are well known as optional ingredients for coating compositions including surfactants, wetting agents, foam depressors, thickeners, alkaline neutralising agents, etc. Such materials are considered herein as film forming ingredients if they do not volatalize during the baking cycle and remain in the deposited coating.

It is normal, but not strictly critical in this invention, that the primer-surfacer composition contain one or more dispersed pigments in order to reduce its costs, as well as provide proper "fill", porosity and opacity to the primer-surfacer coat so that it may be easily sanded and otherwise prepared for application of the top coat. The presence of pigments of the type conventionally used in primer-surfacer compositions in no way adversely affects achievement of the requirements of the automotive industry and in fact is beneficial for that purpose. Pigments of greatest utility are either the common clays or calcined clays or both present to about the same extent, titanium dioxide, carbon black, talc and the like, present to a lesser extent, but other pigments, whether or not imparting color, and whether or not inorganic or organic in nature, may also be present. Compositions containing pigments are prepared by grinding the pigments in the usual manner in a grinding medium which is composed of the film forming ingredients other than the latex to form a pigmented paste and the latex then added last to the pigmented paste. The amount of pigments by weight may be varied widely dependent on their density and covering power, and as is conventional, is best expressed in terms of percent by volume of the deposited coating. They are normally present in the range of about 30 to 45 by volume of the applied coating.

The volatile vehicle or solvent present in the primer coating compositions of this invention consists of water from the latex, and otherwise added, which is the predominant volatile material, normally constituting at least 65 percent of total volatile material, together with minor proportions of water miscible organic solvents such as ethyl cellosolve, butyl cellosolve, ethyl carbitol, butyl carbitol, ethylene glycol, diethylene glycol, dipropylene glycol monomethyl ether, triethanol amine and the like. While ethylene glycol or diethylene glycol is preferably present to aid in "wetting" during application, it is to be understood that the essential volatile ingredient is water and that the nature and presence of other solvents is optional.

Formulations of this invention may contain from as little as about 30 percent to as much as 90 percent of volatile ingredients or solvents, including water, from 10 to 70 percent of film forming or binder ingredients and from 0 to 40 percent of pigments. A typical formulation is detailed in the following example but it is to be understood that it is illustrative only and is not to be construed as limiting the invention to its specific details.

EXAMPLE 3

Primer-Surfacer Formulation

A pigmented primer-surfacer composition containing about 48 percent volatiles of which about 68 percent is water and about 28 percent is ethylene glycol; about 18 percent of film forming ingredients of which over 95 percent are the three essential film forming ingredients and about 34 percent of pigments on a weight basis is prepared by mixing with agitation the following ingredients in the following proportions and in the order listed to produce a liquid vehicle.

|  | Parts | Parts Non-Volatile |
| --- | --- | --- |
| "Cymel 370"[1] | 7.69 | 6.77 |
| "Beetle 800"[2] | 7.12 | 6.84 |
| Epoxy ester of Example 2 | 65.96 | 20.44 |
| Triethanol amine | 9.15 | 0 |
| Dipropylene glycol Monomethyl ether | 13.84 | 0 |
| Amino methyl propanol | 2.15 | 2.15[4] |
| Ethylene glycol | 15.65 | 0 |

-continued

| | Parts | Parts Non-Volatile |
|---|---|---|
| Surfinyl TG[3] | 6.84 | 3.42 |
| Deionized water | 36.42 | 0 |

[1]Methoxylated melamine formaldehyde resin containing 0.1 to 15 percent free methylol groups.
[2]Butoxylated urea formaldehyde resin containing 0.1 to 15 percent free methylol groups.
[3]A surfactant.
[4]Forms salt with carboxyl groups in epoxy ester.

A pigmented paste is then prepared by grinding in a mill, using zirconia particles as grinding agent, the following pigments in the above vehicle.

| Pigment | Parts |
|---|---|
| Titanium dioxide | 56.26 |
| Carbon Black | 8.76 |
| Calcined clay | 296.21 |
| Talc | 4.76 |
| "Benton" anti settling agent | 2.95 |

To the above pigmented paste there is then added with agitation 301.04 parts of the styrene/ethyl acrylate/2-hydroxy-ethyl methacrylate/acrylic acid copolymer latex prepared in Example 1, thereby adding along with the copolymer solids 238.53 parts water.

The composition thus prepared has a pH of 8.5 to 9.0 and is ready for use as a primer-surfacer coating composition. The film forming ingredients consist of 78.27 percent of the resinous copolymer from the latex, 10.41 percent of the epoxy ester, 3.47 percent of the methoxylated melamine formaldehyde resin and 3.51 percent of the butoxylated urea formaldehyde resin.

The composition prepared and formulated as described in Example 1 is tested as indicated hereinabove to determine if it meets the requirements indicated for use as a primer-surfacer in the automotive industry. It is found that it can be spray coated on the required substrate and baked under the required conditions to give a primer-surfacer coating which passes all required adhesion tests before and after exposure to high humidity and high temperature, which, when a test sample of appropriate acrylic lacquer is overcoated thereon, also passes the adhesion tests, and, in addition, the tests for chip resistance. Testing also establishes that the primer-surfacer coat can be easily sanded before application of the top coat and the the finished surface possesses excellent appearance and gloss with no surface defects or blemishes. The composition may be used in regular production in an automotive assembly plant to the complete satisfaction of the user.

The same suitability is also established for various formulations like that described in Example 3 except for variations as hereinabove indicated; for example varying the nature and specific proportions of the film forming ingredients, the volatile ingredients, and the pigments and by testing applicability under a top coat of an appropriate acrylic enamel instead of the acrylic lacquer.

Accordingly, having described the invention, indicated presently known best embodiments and set forth detailed examples, it is to be understood that the invention can be practiced otherwise than as specifically described in those examples and is not to be limited except by the following claims.

What is claimed is:

1. A water-based composition, adapted for use as a primer-surfacer for application to a metallic substrate prior to application of an acrylic lacquer or enamel, characterized in that the film forming or binder ingredients dissolved or dispersed in aqueous solvent include a combination of three distinct types of separately prepared resinous film forming components as follows:

(A) an addition copolymer prepared by the polymerization in aqueous emulsion of a monomer mixture of (1) at least 40 percent by weight of a styrenic monomer (2) from 2 to 8 percent by weight of a hydroxyl functional monomer having a

addition polymerizable group (3) from 1 to 6 percent by weight of a carboxyl functional monomer having a

addition polymerizable group and (4) any remainder of other acrylic monomers having a

polymerizable group, said addition copolymer being present as prepared in aqueous latex form, and the proportion of said addition copolymer being from 50 to 90 weight percent of the total film forming ingredients;

(B) water compatible epoxy ester resin in a proportion of 5 to 40 weight percent of the total film-forming ingredients and (C) water soluble or dispersible aminoplast resin in a proportion of 5 to 20 weight percent of the total film forming ingredients.

2. The composition of claim 1 in which the styrenic monomer is styrene.

3. The composition of claim 2 in which the carboxyl functional monomer is selected from acrylic acid and methacrylic acid.

4. The composition of claim 3 in which the monomer mixture contains from 40 to 60 weight percent of styrene, from 2 to 8 weight percent of hydroxyl functional monomer, from 1 to 6 weight percent of acrylic acid and the balance of an acrylic ester of the formula

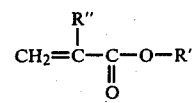

wherein R' is alkyl and R" is hydrogen or alkyl.

5. The composition of claim 4 in which the hydroxyl functional monomer is of the structure

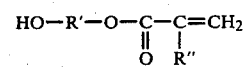

wherein R" is hydrogen or methyl and HO—R' is a hydroxy substituted alkyl radical having 1 to 8 carbon atoms.

6. The composition of claim 5 in which the acrylic ester is ethyl acrylate and the hydroxyl functional monomer is 2-hydroxyethyl methacrylate.

7. The composition of claim 1 in which the epoxy ester resin is water soluble, prepared by partially esterifying hydroxyl groups present in an epoxy resin containing hydroxyl groups and epoxide groups with a drying oil fatty acid.

8. The composition of claim 7 in which the partially esterified epoxy resin is further reacted with maleic anhydride to introduce carboxyl groups.

9. The composition of claim 8 in which the esterified epoxy resin is the reaction product of bisphenol A with diglycidyl ether esterified with drying oil fatty acids and then reacted with maleic anhydride.

10. The composition of claim 1 in which the aminoplast resin is a condensation product of an aldehyde of 1 to 4 carbon atoms with a melamine or urea.

11. The composition of claim 10 in which the aminoresin is a methoxylated melamine formaldehyde condensation product containing from 0.1 to 15 percent of free methylol groups.

12. The composition of claim 1 in which the aminoplast resin ingredient consists of a combination of methoxylated melamine formaldehyde condensation product containing from 0.1 to 15 percent free methylol groups and a butoxylated urea formaldehyde condensation product containing from 0.1 to 15 percent free methylol groups.

13. The composition of claim 1 further characterized in that the aqueous solvent is at least 65 weight percent water and is present in an amount from 30 to 90 weight percent of the entire composition, in that the film forming ingredients are present in an amount from 10 to 90 percent of the entire composition and in that pigments are present in an amount from 30 to 45 volume percent of the non-volatile constituents.

14. The composition of claim 13 further characterized in that the film forming ingredients are (A) an addition copolymer of styrene, ethyl acrylate, 2-hydroxy ethyl acrylate and acrylic acid, (B) a water soluble epoxy ester which is the reaction product of bisphenol A with diglycidyl esterified with drying oil fatty acids and further reacted with maleic anhydride, and (C) the aminoplast resin, a combination of a methoxylated melamine formaldehyde condensation product containing from 0.1 to 15 percent free methylol groups and a butoxylated urea formaldehyde condensation product containing from 0.1 to 15 percent free methylol groups.

* * * * *